United States Patent
Laimböck

(10) Patent No.: US 6,715,455 B2
(45) Date of Patent: Apr. 6, 2004

(54) INTERNAL COMBUSTION ENGINE

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 61 days.

(21) Appl. No.: 10/208,778

(22) Filed: Aug. 1, 2002

(65) Prior Publication Data

US 2003/0033995 A1 Feb. 20, 2003

(30) Foreign Application Priority Data

Aug. 2, 2001 (AT) .................................. 610/2001 U

(51) Int. Cl.⁷ .................................. F02B 27/06
(52) U.S. Cl. .................. 123/65 V; 123/65 PE; 123/73 A; 123/73 V
(58) Field of Search .............. 123/65 V, 65 PE, 123/73 A, 73 V, 73 PP, 65 A, 65 P

(56) References Cited

U.S. PATENT DOCUMENTS

| | | | |
|---|---|---|---|
| 1,671,787 A | * 5/1928 | Schaer | 123/65 V |
| 4,285,311 A | * 8/1981 | Iio | 123/323 |
| 4,368,703 A | 1/1983 | Shibata | |
| 4,516,540 A | 5/1985 | Nerstrom | |
| 4,672,925 A | * 6/1987 | Miyata et al. | 123/65 PE |
| 4,909,193 A | * 3/1990 | Boyesen | 123/65 PE |
| 6,167,874 B1 | * 1/2001 | Becker et al. | 123/572 |

FOREIGN PATENT DOCUMENTS

| | | |
|---|---|---|
| DE | 3637883 | 5/1987 |
| EP | 0413317 | 2/1991 |

* cited by examiner

Primary Examiner—Tony M. Argenbright
Assistant Examiner—Hyder Ali
(74) Attorney, Agent, or Firm—Dykema Gossett PLLC

(57) ABSTRACT

An internal combustion engine with at least one control element for variation of the flow cross-section of a charge exchange passage, which control element is automatically adjustable in accordance with the engine mode by means of an actuating member and a connecting element. In order to permit automatic adjustment of the control element in dependence of engine speed and load in a simple manner, the internal combustion engine be flexibly supported in a frame, and that the actuating member of the control element be supported via the connecting element on at least one pivot fixed in the frame, such that the control element can adjust itself with increasing torque, due to the relative movement between engine and frame resulting from the torque of the combustion engine, thereby increasing the flow cross-section of the charge exchange passage while varying the beginning of the charge changing process.

10 Claims, 4 Drawing Sheets

INTERNAL COMBUSTION ENGINE

BACKGROUND OF THE INVENTION

The invention relates to an internal combustion engine with at least one control element for variation of the flow cross-section of a charge exchange passage, which control element is automatically adjustable in accordance with the engine mode by means of an actuating member and a connecting element.

DESCRIPTION OF PRIOR ART

With the use of this control element it is possible during engine operation to vary the exhaust timing and the amount of exhaust gases discharged, for instance. In this way the torque curve may be flattened, yielding good torque values at low engine speed and improving acceleration of the engine when the control element is turned in closing direction, while the open control element ensures high power output. So far the control element has been actuated in accordance with the number of revolutions or engine speed, using a centrifugal governor device (U.S. Pat. No. 4,368,703) or an electric or hydraulic servomotor and corresponding control device (U.S. Pat. No. 4,516,540). Other attempts include actuation of the control element via a membrane, in accordance with the pressure prevailing in the exhaust system. All these variants are technically complex without permitting automatic adjustment of a mechanically actuated control element in dependence of engine speed and load. Another known design of a two-stroke engine provides that the crankside edge of the intake port be adjusted by a control body in stroke direction in order to achieve satisfactory pre-compression during start-up and in the lower speed range and prevent a return flow of air or charge mixture into the intake port (DE 36 37 883 A1), but this control element, which is provided on the intake side, once more is actuated by a servomotor.

EP 0 413 317 A1 shows an exhaust valve system for a two-stroke engine with several cylinders. Transfer and exhaust ports are staggered around the cylinder axis to permit a compact design. Each exhaust passage contains a control element for flow control, which is actuated by a servomotor.

SUMMARY OF THE INVENTION

It is the object of the present invention to eliminate this deficiency and provide an internal combustion engine of the afore-mentioned type wherein adjustment of the control element is effected by simple means in dependence of engine torque.

According to the invention this object is achieved by providing that the internal combustion engine be flexibly supported in a frame, and that the actuating member of the control element be supported via the connecting element on at least one pivot fixed in the frame, such that the control element can adjust itself with increasing torque, due to the relative movement between engine and frame resulting from the torque of the combustion engine, thereby increasing the flow cross-section of the charge exchange passage while varying the beginning of the charge changing process.

Preferably, a first control element is provided in at least one charge exchange passage configured as an exhaust passage, which control element can be actuated by supporting it on a pivot fixed inside the frame.

An engine that is flexibly supported in a frame is characterized by a certain rotatory and/or translatory degree of freedom decreasing with an increase in torque. Hence a relative movement between the engine and its frame will result, which may be utilized for actuation of the first control element varying the flow cross-section of the exhaust port. This first control element will open when the engine is operating at high load, thus uncovering a larger cross-section of the exhaust port for a prolonged period of time and resulting in higher torque values at higher engine speeds. Adjustment of the control element takes place fully automatically in dependence of engine load and speed.

Above all engines operating on the two-stroke cycle may be provided with a second control element located in the intake passage, which will also be actuated by supporting it on a pivot fixed in the frame. The second control element, which is actuated in the same manner as the first control element and is located in the intake passage controlled by the piston edge on the side of the crank, will raise the charge level when the engine speed is high and the control element in open position, and advance pre-compression and thus increase the engine torque when the speed is low and the flow cross-section of the intake port is reduced.

A particularly simple design will be obtained if the control element is configured as a flap turning about an edge or a central axis.

In a two-stroke internal combustion engine with at least one charge exchange passage configured as a transfer passage it may be provided that a third control element be positioned in the at least one charge exchange passage configured as a transfer passage, which also may be actuated by supporting it on a pivot fixed in the frame.

For an engine operating on the two-stroke cycle it will be of advantage if the control element is capable of varying the flow cross-section of the exhaust passage and/or the intake passage in the direction of the cylinder axis. In order to achieve an effective flow control of the flow through the exhaust passage, it is proposed that the first control element configured as a one-sided flap be held at the top side of the exhaust passage next to the top of the combustion chamber. It may further be provided that the second control element configured as a one-sided flap be held at the bottom side of the intake passage distant from the top of the combustion chamber. If the first and/or second control element is at least partially closed, the above measures will induce the control edge of the piston first of all to uncover the half of the exhaust port and/or intake port covered by the flap, thus preventing short-circuiting due to the partially closed cross-section.

The proposed flow control system will not be limited to two-stroke engines but will also be useful with four-stroke engines. In this case the first control element is positioned downstream of the exhaust valve, and preferably in the area of an exhaust flange.

BRIEF DESCRIPTION OF THE DRAWING

The invention will now be further described with reference to the attached drawings, wherein.

Parts of identical function have identical reference numbers in both variants.

DETAILED DESCRIPTION OF THE PREFERRED VARIANTS

Figure 1:
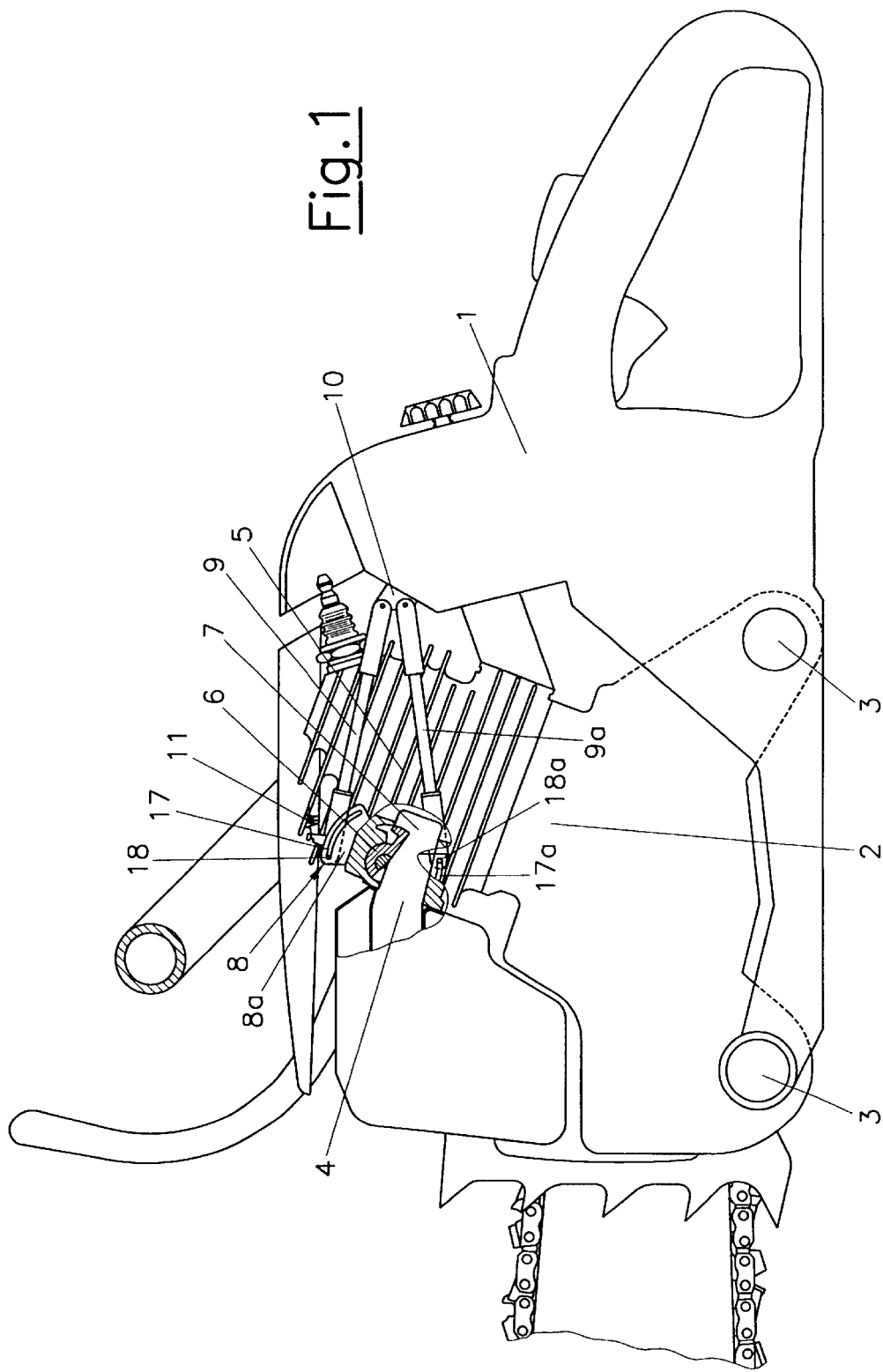
FIG. 1 shows a first variant of an internal combustion engine according to the invention, for use with a chain-saw, in a partial section in simplified view.

A single-cylinder, two-stroke internal combustion engine 2 is flexibly supported at points 3 in the frame 1 of a chainsaw, which is only shown in contour. In the exhaust passage 4 of the cylinder 5 of the internal combustion engine 2 a first control element 6 configured as a flap is provided, by means of which the flow cross-section of the exhaust port 7 can be varied in the direction of the cylinder axis 5a.

Figure 2:
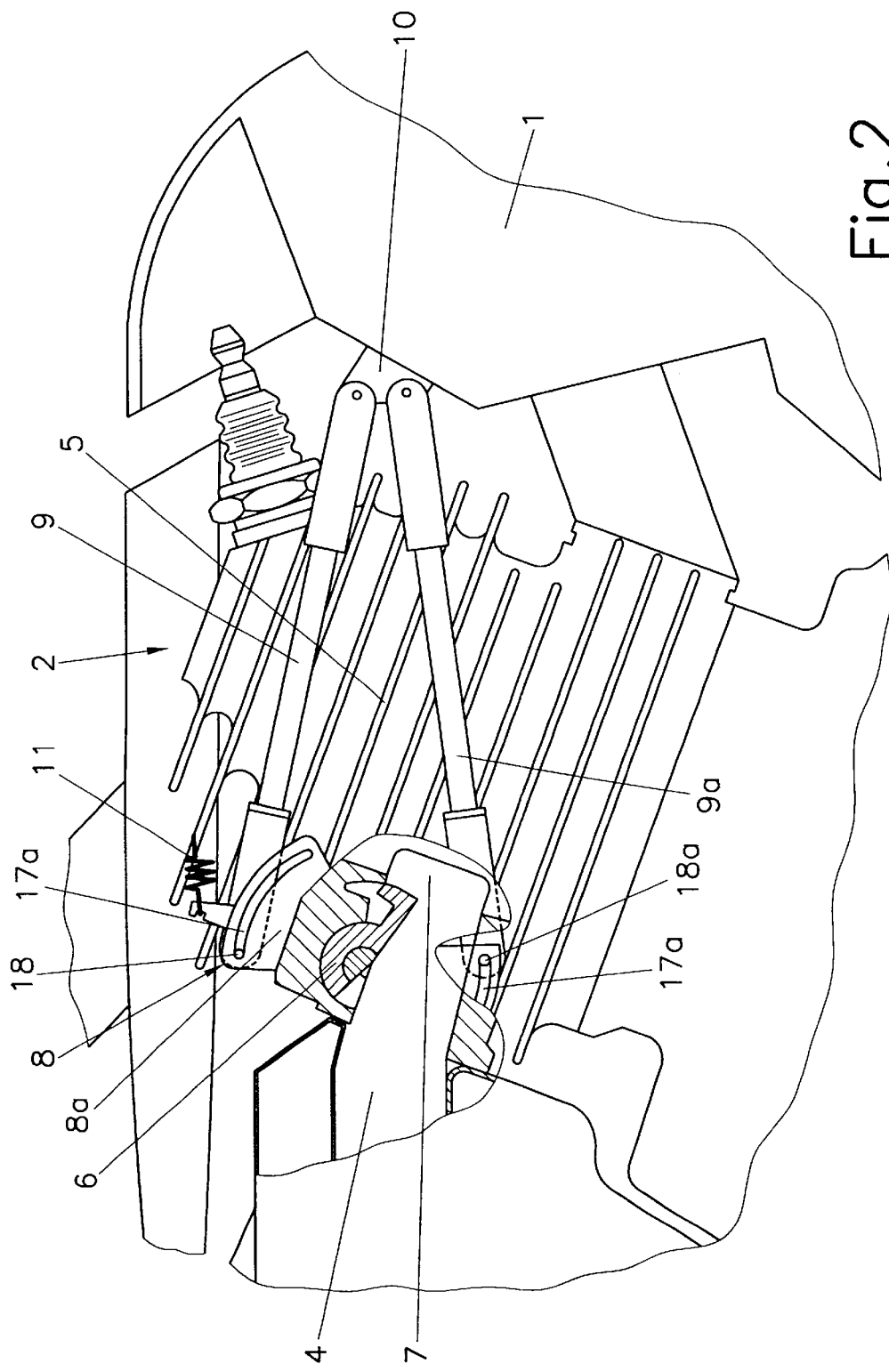
FIG. 2 shows a part of the engine at a larger scale, represented as above.
Figure 3:
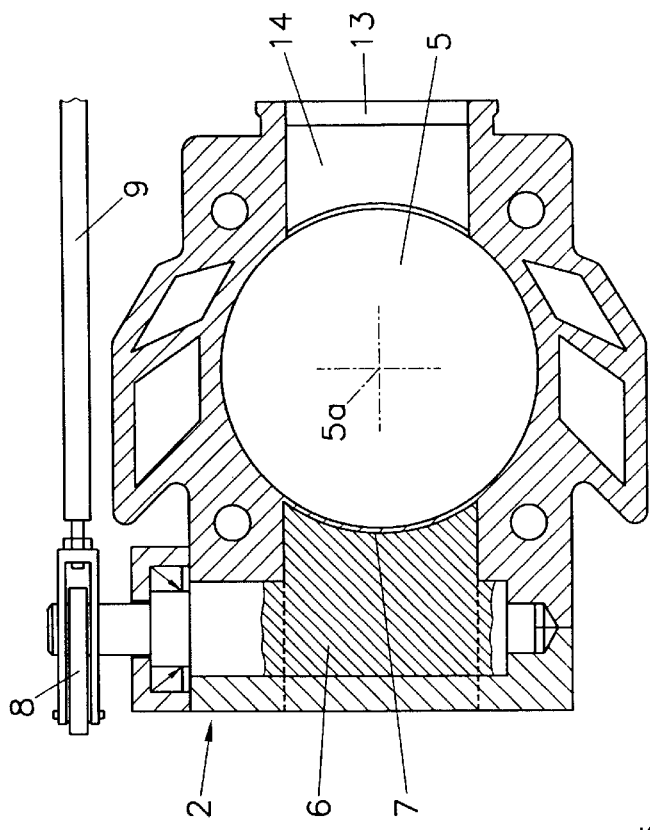
FIG. 3 shows the cylinder of the engine in axial section.

FIGS. 1 and 2 show the position of the first control element 6 corresponding to the idling mode or lowest torque region of the engine. The first control element 6 should fully uncover the exhaust port 7 of the exhaust passage 4 at high engine torque or load, as is shown in FIG. 3. In order to ensure automatic actuation of the control element 6, the actuating member 8, i.e., the lever 8a corresponding to a crank arm is supported via a rod 9 on a pivot 10 fixed in the frame 1, and the entire engine 2 is spring-loaded by a tension spring 11 in clockwise direction. When the chainsaw is in operation, the engine 2 undergoes a slight counter-clockwise rotation due to reaction forces and its flexible support in the frame 1. As the lever 8a is locked by the rod 9, the first control element 6 will be rotated from the position shown in FIGS. 1 and 2 to the position of FIG. 3. Since the working direction of a chainsaw is liable to change the lever 8a is extended downwards beyond the axis of the first control element 6, where another rod 9a will engage to become effective upon a clockwise rotation of the engine 2, the lever 8a being provided with part-circular slots 17, 17a for the bolts 18, 18a connecting it to the rods 9, 9a, so that the lever motion initiated by rod 9 and 9a, respectively, will not impede the lever motion initiated by the other rod 9a, 9.

Figure 4:
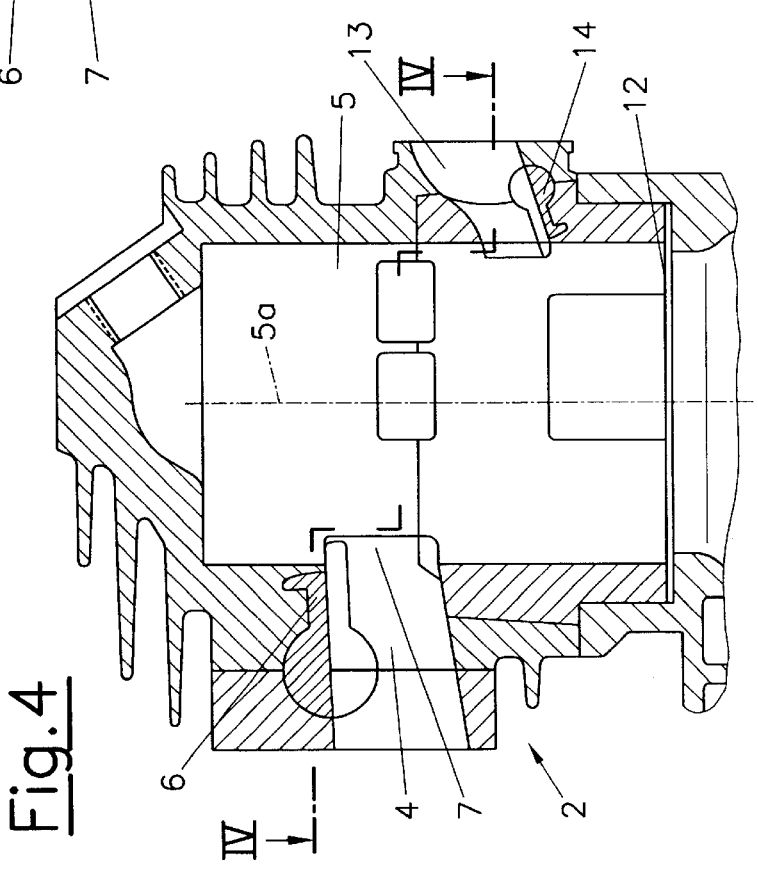
FIG. 4 shows the engine in a cross-section along line IV—IV in FIG. 3.

As shown in FIGS. 3 and 4, the inlet 13 governed by the crankside piston edge 12 may also be provided with a second control element 14, which will be actuated in the same manner as the first control element 6.

Figure 5:
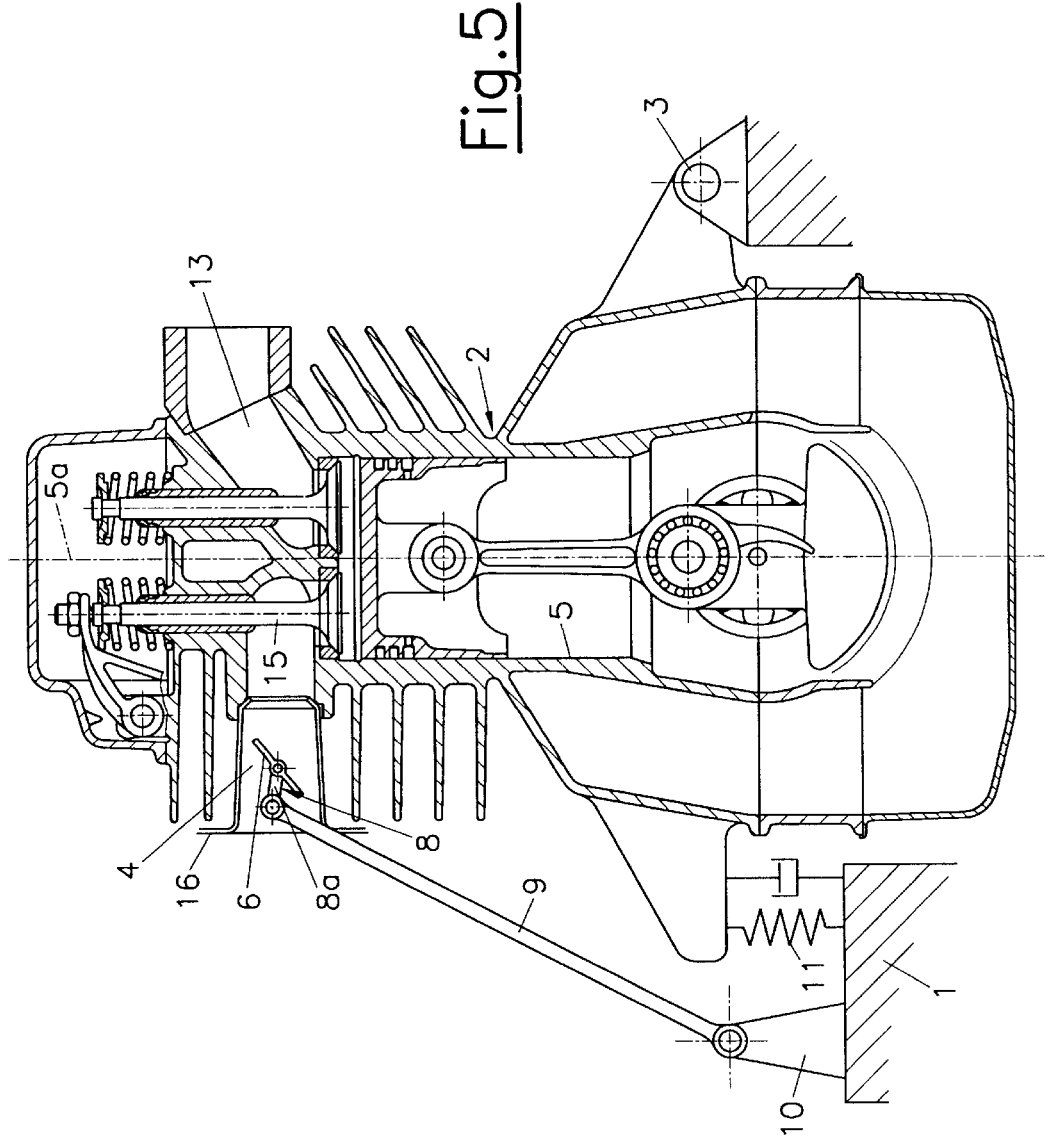
FIG. 5 shows a second variant of an internal combustion engine according to the invention, in axial section.

FIG. 5 shows an internal combustion engine operating on the four-stroke cycle, which is also supported by a frame 1 like the variant presented in FIGS. 1 to 4, the engine 2 being preloaded in clockwise direction relative to the frame 1 by means of a spring 11. The first control element 6 is located in the exhaust passage 4 downstream of the exhaust valve 15 in the area of an exhaust flange 16. With increasing torque the engine undergoes a slightly counter-clockwise rotation relative to the frame 1, causing the first control element 6 configured as a centrally held flap to uncover the flow cross-section of the exhaust passage 4, so that a high power output will be possible.

What is claimed is:

1. An internal combustion engine with at least one control element for variation of a flow cross-section of a charge exchange passage, which control element is automatically adjustable in accordance with the engine mode by means of an actuating member and a connecting element, wherein the internal combustion engine is flexibly supported in a frame, and the actuating member of the control element is supported via the connecting element on at least one pivot fixed in the frame, such that the control element can adjust itself with increasing torque, due to the relative movement between engine and frame resulting from the torque of the combustion engine, thereby increasing the flow cross-section of the charge exchange passage while varying the beginning of the charge changing process.

2. The internal combustion engine according to claim 1, wherein the connecting element is formed by a rod or linkage.

3. The internal combustion engine according to claim 1, wherein the control element is formed by a flap turning about an edge or a central axis.

4. The internal combustion engine according to claim 1, wherein a first control element is provided in at least one charge exchange passage configured as an exhaust passage, said control element being actuated by supporting it on a pivot fixed inside the frame.

5. The internal combustion engine according to claim 1, wherein a second control element is provided in at least one charge exchange passage configured as an intake passage, said control element being actuated by supporting it on a pivot fixed inside the frame.

6. The internal combustion engine according to claim 1, the engine operating on the two-stroke cycle and at least one charge exchange passage being configured as a transfer passage, wherein a third control element is provided in the at least one charge exchange passage configured as a transfer passage, which is also actuated by supporting it on a pivot fixed in the frame.

7. The internal combustion engine according to claim 1, the engine operating on the two-stroke cycle and the exhaust passage or intake passage being controlled by a piston, wherein the control element is capable of varying the flow cross-section of the exhaust passage or the intake passage in the direction of the cylinder axis.

8. The internal combustion engine according to claim 7, wherein the first control element configured as a one-sided flap is held at the top side of the exhaust passage next to a top of a combustion chamber.

9. The internal combustion engine according to claim 7, wherein the second control element configured as a one-sided flap is held at a bottom side of the intake passage distant from the top of the combustion chamber.

10. The internal combustion engine according to claim 1, wherein the engine operates on the four-stroke cycle.

* * * * *